United States Patent [19]

Vitous

[11] 3,952,641
[45] Apr. 27, 1976

[54] BEVERAGE BREWER APPARATUS
[75] Inventor: Charles J. Vitous, Berwyn, Ill.
[73] Assignee: Cory Food Services, Inc., Chicago, Ill.
[22] Filed: Jan. 27, 1975
[21] Appl. No.: 544,488

[52] U.S. Cl. .................................. 99/295; 99/309
[51] Int. Cl.² .................................... A47J 31/00
[58] Field of Search ............. 99/295, 279, 283–284, 99/287, 290–291, 292–293, 294, 298–299, 303, 304–305, 306–307, 309

[56] References Cited
UNITED STATES PATENTS

| | | | |
|---|---|---|---|
| 1,678,543 | 7/1928 | Watson | 99/309 |
| 3,561,349 | 2/1971 | Endo et al. | 99/295 |
| 3,771,431 | 11/1973 | Ehrenberg, Jr. | 99/295 |
| B359,187 | 1/1975 | Vitous | 99/295 |
| R27,959 | 4/1974 | Alexander, Jr. et al. | 99/295 |

Primary Examiner—Robert W. Jenkins
Assistant Examiner—Arthur O. Henderson
Attorney, Agent, or Firm—Wegner, Stellman, McCord, Wiles & Wood

[57] ABSTRACT

A beverage brewing apparatus wherein a brewing cartridge is adjustably mounted in the apparatus for selectively positioning a portion thereof for holding a bagged charge of coffee in contact with a force distributing surface of a water supply delivery element. The structure provided for supporting the cartridge is arranged to support the cartridge at any one of a plurality of different levels to accommodate corresponding different size bags to have optimum association with the hot water delivery element. The supporting structure provides preselected discrete positioning of the cartridge and permits facilitated installation and removal of the cartridge in the servicing of the brewing apparatus.

14 Claims, 7 Drawing Figures

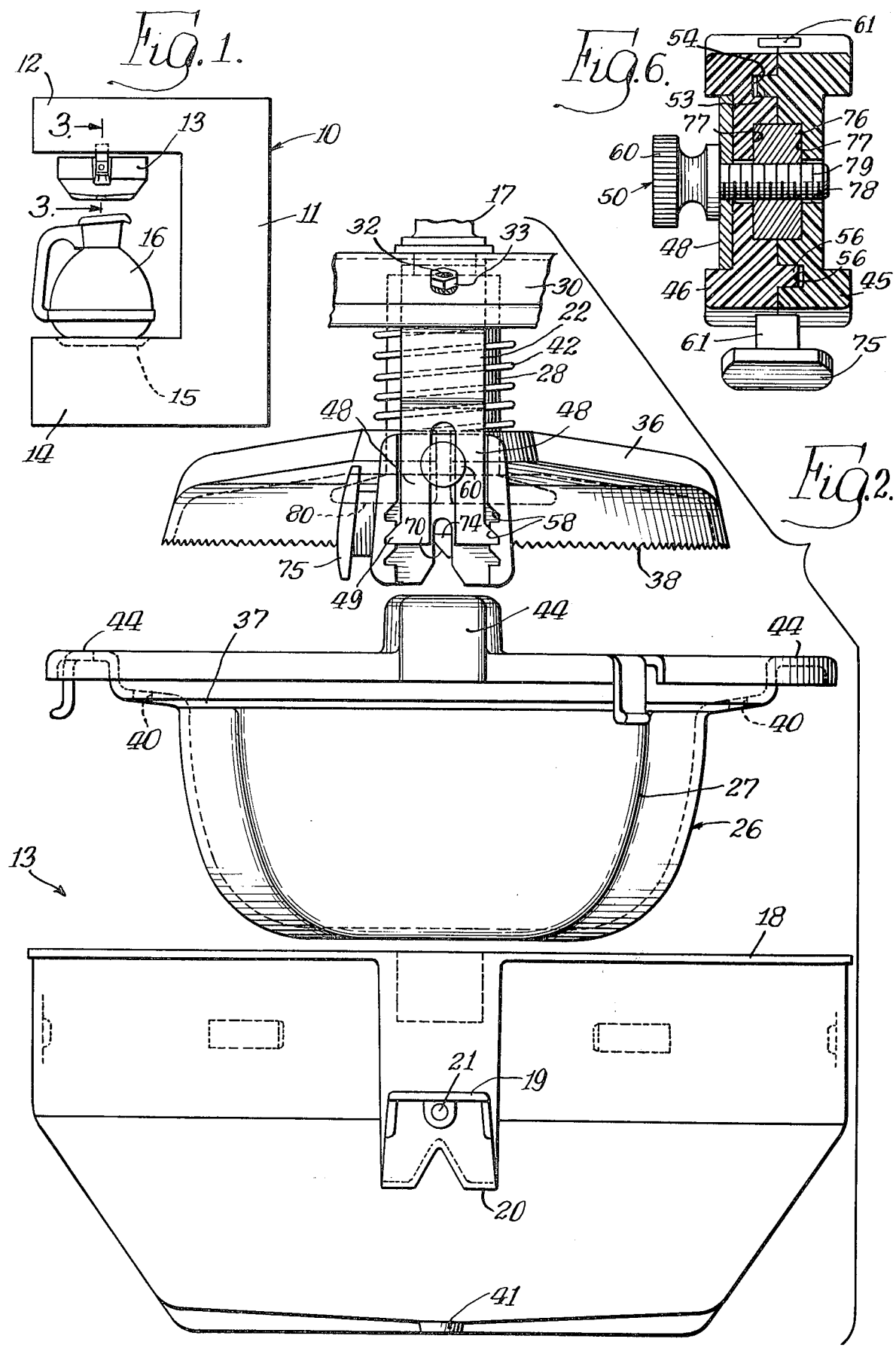

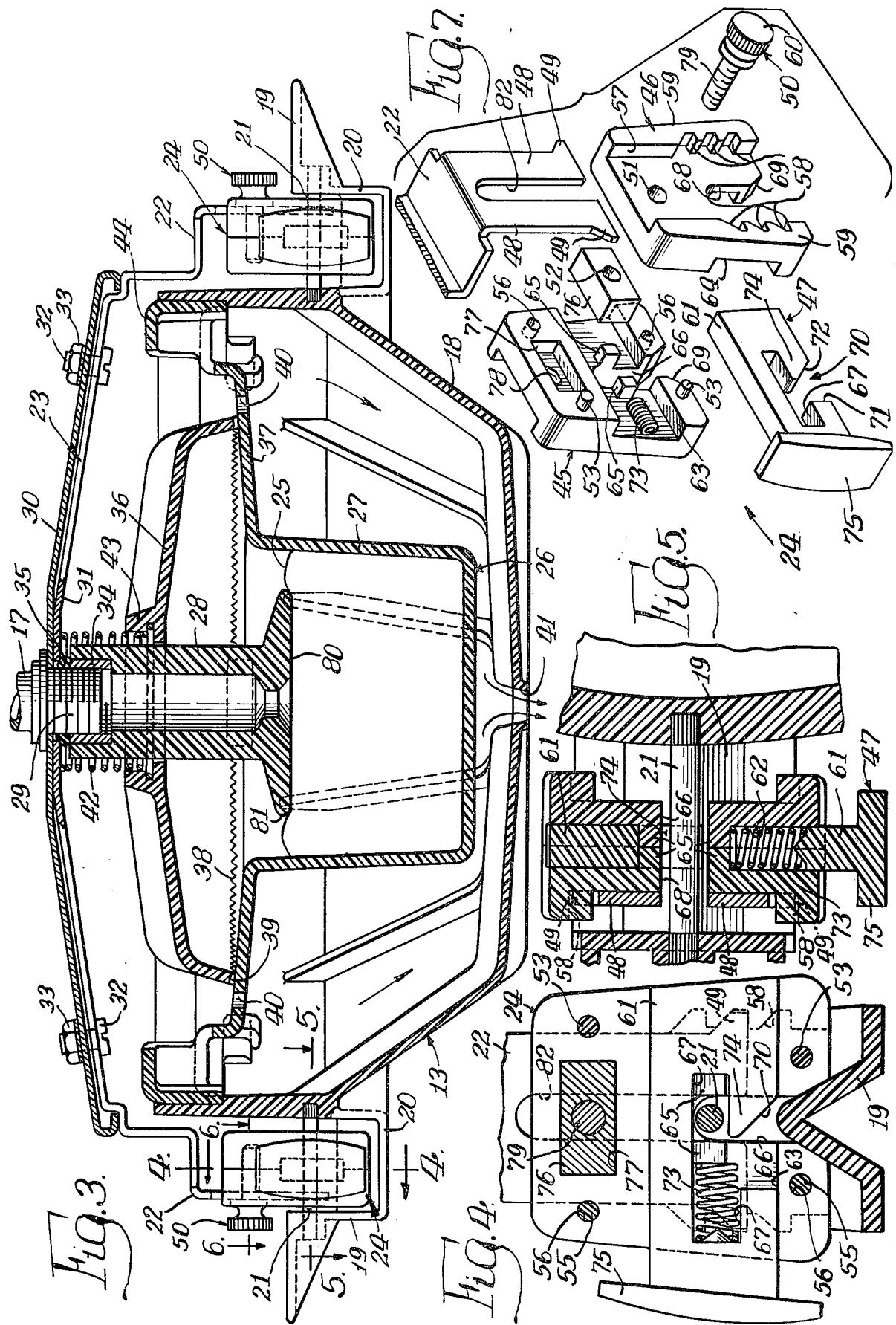

BEVERAGE BREWER APPARATUS

BACKGROUND OF THE INVENTION

1. Field of the Invention

This invention relates to beverage brewing apparatus and in particular to coffee brewing apparatus.

2. Description of the Prior Art

In one improved form of brewing apparatus, such as shown in United States Letters Patent 3,771,431 of Milton F. Ehrenberg, Jr., owned by the assignee hereof, coffee is brewed by means of a bagged charge of ground coffee disposed in a brewing chamber in contact with a hot water delivery element. The brewed coffee flows upwardly from the brewing chamber through a filter and thence outwardly through a spout into a subjacent decanter or the like.

As shown in the Ehrenberg patent, the cartridge defining the brewing chamber is removably installed on a bracket so as to position the bagged charge in contact with the lower surface of a force distributing portion of the water delivery element. As further illustrated in the Ehrenberg patent, the expansion of the bagged charge upon the introduction of the hot water thereinto causes the bag to swell up around the periphery of the delivery element.

It is conventional in the art to provide such bagged charges to have preselected different brewing capacities or volumes depending on the number of cups of coffee intended to be brewed. Thus, in certain instances, a relatively large bag of ground coffee may be utilized for brewing a relatively large number of cups of coffee or, alternatively, a relatively small bag of ground coffee may be utilized for brewing a relatively small number of cups of ground coffee with the same apparatus.

SUMMARY OF THE INVENTION

The present invention comprehends an improved brewing apparatus wherein the bag holder cartridge is supported in the apparatus in any one of a plurality of different brewing positions so as to provide optimum support of any one of a plurality of different volume bagged ground coffee charges.

More specifically, the invention comprehends providing such a brewing apparatus wherein the brewing cartridge defining the brewing chamber is carried on a support which is adapted to retain the bagged charge in contact with a downwardly facing surface of a hot water delivery element. In the illustrated embodiment, the support means is arranged to provide discrete positioning of the cartridge at different levels.

More specifically, the invention comprehends a support bracket having end portions and mounting elements carried on each of the end portions in any one of a plurality of discrete positions. The mounting elements may include a spring released latch for supporting the cartridge to the mounting means at the preselected different levels corresponding to the different discrete positions of the mounting means on the bracket.

The mounting means and means for selective positioning on the support bracket are extremely simple and economical of construction while yet providing the highly desirable improved cartridge support as discussed above.

BRIEF DESCRIPTION OF THE DRAWING

Other features and advantages of the invention will be apparent from the following description taken in connection with the accompanying drawing wherein:

FIG. 1 is a side elevation of a coffee brewer provided with a cartridge support embodying the invention;

FIG. 2 is a fragmentary enlarged front elevation thereof;

FIG. 3 is an enlarged vertical cross section taken substantially along the line 3—3 of FIG. 1;

FIG. 4 is a fragmentary enlarged vertical cross section taken substantially along the line 4—4 of FIG. 3;

FIG. 5 is a fragmentary enlarged horizontal section taken substantially along the line 5—5 of FIG. 3;

FIG. 6 is a fragmentary enlarged horizontal section taken substantially along the line 6—6 of FIG. 3; and FIG. 7 is a fragmentary exploded view of the mounting means and the end mounting portion of the support bracket.

DESCRIPTION OF THE PREFERRED EMBODIMENT

In the exemplary embodiment of the invention as disclosed in the drawing, a coffee brewer generally designated 10 is shown to comprise a cabinet 11 having an upper portion 12 for carrying a brewing cartridge 13. The cabinet may further include a lower portion 14 provided with a warmer 15 for carrying a decanter 16 subjacent the brewing cartridge 13 suitably to receive the brewed coffee therefrom. Brewer 10 may include conventional hot water supply means of any suitable type having a hot water delivery conduit 17 for delivering the hot water downwardly into cartridge 13 when it is installed in the brewer, as shown in FIG. 1.

The brewing cartridge may include a bowl 18 provided with opposite handles 19. Each of the handles defines a channel portion 20 traversed by a mounting pin 21 for use in supporting the cartridge removably on the opposite ends 22 of a support bracket generally designated 23. Each of the ends 22 is provided with a mounting means generally designated 24 adapted for releasably mounting the cartridge in any one of a plurality of different positions on the support bracket. In the illustrated embodiment, the mounting means 24 supports the cartridge in preselected discrete positions, and more specifically herein, in three discrete positions so as to position the cartridge selectively at any one of three different levels. In the illustrated embodiment, the bagged ground coffee 25 is supported in the cartridge by means of an adaptor 26 defining a central well 27. A hot water delivery element 28 is threadedly secured to a connector portion 29 of conduit 17 extending downwardly through a support wall 30 of the cabinet 11. Bracket 23 includes a bight portion 31 secured to the support wall 30 by suitable means such as screws 32 and nuts 33. The delivery element may be provided with a metal bushing 34 for threaded association with the connector portion 29 and an O-ring 35 may be disposed between the bushing and bracket portion 31 for sealing the delivery element 28 to the connector portion 29.

A filter member 36 may be provided movable coaxially on the delivery element 28 for cooperation with an outturned apron 37 of adaptor 26 to define means for filtering the brewed coffee delivered upwardly from well 27 in the brewing operation. Thus, the filter member 26 defines a downturned, toothed lower edge 38 which cooperates with apron 37 to define a plurality of flow passages 39 conducting the coffee outwardly to a plurality of delivery openings 40 in apron 37 outwardly of the passages 39 whereby the brewed coffee may flow downwardly through the bowl 18 of the cartridge below the adaptor to a lower center outlet 41 for passing the brewed coffee downwardly into the decanter. Filter member 36 is biased downwardly by a coil spring 42 compressed between a retainer portion 43 of the filter member and the bight portion 31 of bracket 23, as shown in FIG. 3. The adaptor may be provided with a pair of handle portions 44 for facilitated insertion and removal of the adaptor relative to the cartridge bowl as in servicing of the brewing cartridge.

As discussed above, the prebagged charges 25 of coffee are provided by the coffee distributors in different sizes for use in brewing different quantities of coffee in brewers, such as coffee brewer 10. The present invention comprehends the selective support of the cartridge 13 for optimum positioning of the different size bags 25.

More specifically, mounting means 24 includes a back member 45, a front member 46, and a latch 47. Bracket end 22 defines a pair of downwardly extending legs 48, each terminating in outwardly extending tabs 49 and spaced apart by a downwardly opening slot 82. Mounting means 24 is adjustably secured to the legs 48 by means of a thumbscrew 50 which extends through a hole 51 in front member 46 and threaded into a complementary hole 52 in a mounting block 76 received in complementary recesses 77 of members 45 and 46, as shown in FIG. 6. Back member 45 may include a hole 78 aligned with hole 51 of front member 46 for accommodating the shank 79 of thumbscrew 50, as shown in FIG. 6. Front member 46 is accurately positioned relative to back member 45 by means of a plurality of locating dowels 53 on back member 45 received in suitable complementary holes 54 in front member 46 and pins 55 received in suitable complementary holes 56 in rear member 45.

Front member 46 defines an outwardly opening recess 57 having a depth at least equal to the thickness of the legs 48 for receiving the legs flatwise therein for selective disposition of the tabs 49 selectively in any one of a plurality of complementary recesses 58 in the opposite side wall portions 59 of the front member. The legs 48 are secured in facial association with the front member in recess 56 by the head portion 60 of the thumbscrew 50, as illustrated in FIGS. 3 and 6. Thus, mounting means 24 may be readily selectively positioned in any one of three different positions on the bracket ends 22 by suitable positioning of the tabs 49 in a selected pair of recesses 58.

Cartridge 13 is removably carried on the mounting means 24 by suitably engaging the pins 21 with the latch 47 of the mounting means. As shown in FIGS. 6 and 7, each latch comprises a shank 61 which is slidably received in a slot 62 defined by complementary half slots 63 and 64 in the back and front members, respectively. Back member 45 defines a pair of forwardly extending ears 65 at opposite sides of a vertical slot 66 thereof and received in a horizontal slot 67 in latch shank 61. Front member 46 is provided with a similar downwardly opening slot 68 and each of slots 66 and 68 is provided with a beveled entrance portion 69 at the lower end thereof. Latch shank 61 is provided with a downwardly opening slot 70 opening upwardly to slot 67. Slot 70 is defined by a vertical outer edge 71 and an inclined inner edge 72.

The latch is biased outwardly by a coil spring 73 which is received in slot 67 outwardly of the outer end 65 so as to bias the latch outwardly to bring a catch portion 74 thereof in line with the slots 66 and 68 of the back and front members. The latch further includes a thumb portion 75 for use in urging the latch against the biasing action of spring 73 for selectively aligning the slot 70 with the slots 66 and 68.

Thus, as shown in FIGS. 3, 4 and 5, to install the cartridge 13 on the mounting means 24, the user need merely press thumb piece 75 inwardly to align slot 70 of the latch with the mounting means slots 66 and 68 with the catch portion 74 disposed inwardly of the mounting means slots. This permits the users to insert the pins 21 upwardly through the aligned vertical slots 50 of the support bracket, 66 and 68 of the mounting means, and 70 of the latch until the pins are aligned with the horizontal slots 67 of the latch whereupon release of the thumb piece 75 permits catch 74 to be positioned under the pin 21, as shown in FIG. 4, for removably retaining the cartridge in position on the mounting means. In the illustration of FIG. 4, the mounting means is mounted to the bracket end 22 with the tabs 49 received in the middle recess 58 so that the cartridge 13 is disposed at an intermediate level. As will be obvious to those skilled in the art, rearrangement of the mounting means 24 so as to dispose the tabs 49 either in the lowermost recess 58 or uppermost recess 58 of the front member 46 will permit the selective positioning of the cartridge at an uppermost level or a lowermost level, respectively. Positioning of the mounting means 24 on the bracket legs and mounting of the cartridge by the insertion of pins 21 into slot 67 is identical in each of the three different mounted positions of the mounting means 24 on the bracket legs.

The mounting of the mounting means 24 on the bracket legs is preselected to correspond to the use of the desired size bag 25 so as to position the top of the bag in contact with the undersurface 80 of the delivery element 28 without undue pressure on the bag and permit the swell of the bag upwardly around the periphery 81 of the surface 80, as illustrated in FIG. 3, during the brewing operation.

Upon completion of the brewing operation, the user need merely depress the thumb piece 75 to align slot 70 with vertical slots 82, 66 and 68, permitting the pins 21 to be dropped downwardly from the mounting means 24, thereby removing the cartridge from the brewer for disposal of the spent charge, etc. As the latch is biased by the spring 73, the replacement of the cartridge in the mounting means 24 is effected by the simple upwardly raising of the cartridge with the pins bearing against the inclined slot surfaces 72 to urge the latch inwardly and thereby pass the pins into the horizontal slot 67, whereupon spring 73 restores the catch portion 74 below the pins 21 to again secure the cartridge in the brewer.

The improved mounting means 24 facilitates the use of different size bagged charges, as discussed above. As will be obvious to those skilled in the art, the selective vertical positioning afforded by the mounting means 24 may be utilized for other purposes, as desired.

The mounting means 24 is extremely simple and economical of construction and may be readily installed and removed relative to the support bracket 23, as desired.

The foregoing disclosure of specific embodiments is illustrative of the broad inventive concepts comprehended by the invention.

I claim:

1. In a beverage brewer having a brewing receptacle for holding bagged charges of beverage forming material, and means for providing brewing liquid to said receptacle for treating the beverage forming material to brew a desired beverage therein, said liquid providing means including a delivery element defining a surface through which the liquid is delivered into the receptacle, the improvement comprising means for selectively arranging the brewer to accommodate any one of a plurality of different volume bagged charges for brewing corresponding different quantities of beverage defined by means for mounting the receptacle below said liquid providing means surface in any one of a plurality of preselected different positions to cause each corresponding one of said different volume bagged charges selectively disposed in said receptacle to be urged against said surface with less than a preselected maximum pressure to preclude rupture of the bagged charge while providing good sealed contact of the bagged charge with said surface during delivery of the brewing liquid thereto by said liquid providing means.

2. The beverage brewer means of claim 1 wherein said receptacle defines a wall having a transverse bottom wall for supporting the bagged charge and said mounting means defines means for spacing said transverse wall selectively at any one of a plurality of preselected different spacings below said surface to effect said sealed contact of corresponding different volume bagged charges with said surface.

3. The beverage brewer means of claim 1 wherein said mounting means comprises means for removably mounting the receptacle in the brewer for selective placement of any one of said different volume selected bagged charges in the receptacle, brewing of the beverage from the bagged charge material placed in the receptacle, and discarding of the spent bagged charge upon removal of the receptacle from the brewer subsequent to the brewing operation.

4. The beverage brewer means of claim 1 wherein said mounting means includes a carrier mounted in positionally fixed association with one of said liquid providing means or receptacle, and selectively adjustable connector means associated with the other of said liquid providing means or receptacle for removably mounting the receptacle to the carrier to be in any one of said different positions relative to said liquid providing means surface.

5. The beverage brewer means of claim 1 wherein said mounting means includes a spring biased latch mounted in positionally fixed association with one of said liquid providing means or receptacle, and selectively adjustable connector means associated with the other of said liquid providing means or receptacle for removably mounting the receptacle to the latch to be in any one of said different positions relative to said liquid providing means surface.

6. In a beverage brewer having a brewing liquid delivery means, and a brewing receptacle means, structure for selectively mounting the receptacle means in the brewer subjacent the delivery means for receiving brewing liquid from said delivery means, comprising: support means defining a slot having an outwardly open end; spring biased latch means disposed for selectively closing said slot; a latch pin on said receptacle arranged to be inserted through said end into said slot and selectively held therein by said latch for supporting the receptacle subjacent said liquid delivery means; and means for selectively adjustably positioning the latch means at any one of a plurality of different levels for correspondingly supporting the receptacle at any one of a plurality of different levels below the liquid delivery means.

7. The beverage brewer mounting structure of claim 6 wherein said latch means is carried by said support means and said means for adjustably positioning the latch means comprises means for selectively adjustably positioning the support means in any one of a plurality of different positions.

8. The beverage brewer mounting structure of claim 6 wherein said support means comprises a bracket having a downwardly extending end portion defining said slot and a carrier selectively mounted to said bracket end portion at any one of a plurality of different levels, said latch means being carried by said selectively positionable carrier for correspondingly selectively positioning the latch means at any one of said different levels thereof.

9. The beverage brewer mounting structure of claim 6 wherein said positioning means comprises means for positioning said latch means at preselected discrete different level positions.

10. The beverage brewer mounting structure of claim 6 wherein said positioning means comprises means for positioning said latch means at at least three different levels.

11. In a beverage brewer having a brewing receptacle for holding a bag of brewing ingredients, and hot water delivery means for delivering water into said bag in the receptacle, the improvement comprising means for selectively supporting the receptacle at a plurality of different levels below the hot water delivery means for causing the top surface of each one of corresponding different volume bags to engage the delivery means in substantially the same manner to provide similar hot water delivery to any one of said different volume bags.

12. The beverage brewer improvement of claim 11 wherein said supporting means comprises means for supporting the receptacle in different preselected discrete positions.

13. The beverage brewer improvement of claim 11 wherein said supporting means comprises means for supporting the receptacle in at least three different preselected discrete positions.

14. The beverage brewer improvement of claim 11 wherein said supporting means includes spring biased means for releasably securing the receptacle thereto.

* * * * *